June 27, 1967  J. A. SOULES  3,328,192
METHOD OF PRODUCING OPTICAL GRATINGS
Filed July 31, 1963
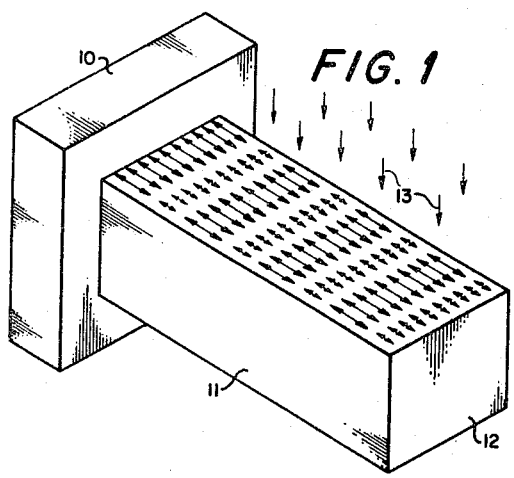
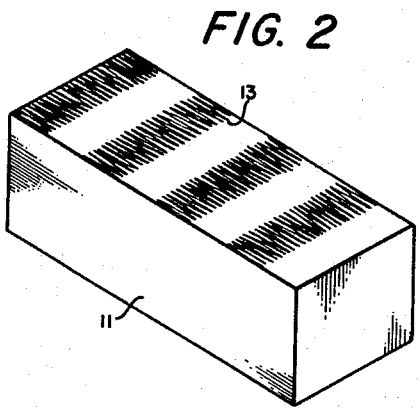
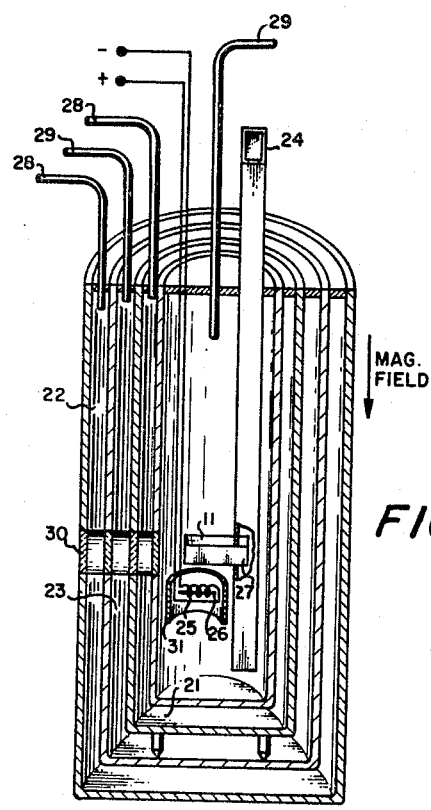
INVENTOR
JACK A. SOULES United States Patent Office 3,328,192
Patented June 27, 1967

3,328,192
METHOD OF PRODUCING OPTICAL GRATINGS
Jack A. Soules, Arlington, Va.
(Box 596, University Park, N. Mex. 08070)
Filed July 31, 1963, Ser. No. 299,127
4 Claims. (Cl. 117—37)

The invention described herein may be manufactured and used by or for the Government of the United States of America for governmental purposes without the payment of any royalties thereon or therefor.

The present invention is directed to optical gratings and more particularly to a method of forming an improved optical grating of very small spacing.

Heretofore optical gratings have been produced by delicate, precision machines that produce lines onto a base surface, such as, quartz, glass, rock salt or sylvite crystals. Such a process takes a long period of time requiring controlled conditions such as temperature and atmospheric pressure. Another method produces on a basic surface a composite body or structure consisting of thin laminations deposited by a vaporizing process. The laminations consist alternately of a chemically inert material and a material which is capable of being attacked chemically. A cross-section of the composite body is cut, polished and afterwards etched. By etching, the layers which are less chemically resistant manifest themselves as fine grooves which represent a line grating with a large number of lines per millimeter. Each of these methods have their drawbacks that require rigid controls for making satisfactory optical gratings.

The present invention is directed to a new process of making optical gratings that do not require the rigid controls of other methods and yet produces an optical grating that has more lines per millimeter than the prior art methods. The present invention makes use of a ruby or quartz crystal at low temperature through which monochromatic sound waves are passed and upon which metal hot atoms are evaporated onto a surface of the crystal. The hot atoms line up into finite lines that form the grating.

It is therefore an object of the present invention to produce an optical grating with very close lines.

Another object is to produce an optical grating by evaporating a metal onto a base surface.

Still another object is to provide a method of forming very close lines on a crystal to produce an optical grating.

Yet another object is to produce a new method of forming optical gratings.

Other and more specific objects of this invention will become apparent upon a more careful consideration of the following detailed description when taken together with the accompanying drawings, in which:

FIG. 1 illustrates a system in block form for carrying out the method of the present invention;

FIG. 2 illustrates a finished product of the method; and

FIG. 3 illustrates a cross sectional view of a system by which the grating can be made.

The method of the present invention is made possible by recent advances in the generation of coherent phonons in solids. A monochromatic sound wave is sent through a crystal maintained at a low temperature. The sound wave builds up a standing vibrational wave in the crystal. The standing vibrational wave in the crystal produces a standing vibration pattern of the atoms in the surface of the crystal which are characterized as a periodic vibration of the effective local temperature of the surface. Metal atoms from a remote hot source are evaporated onto the "active" surface of the crystal affecting the mobility of the atoms in the plane of the surface due to the atomic vibrations. Thus the metal atoms accumulate in definite lines perpendicular to the direction of propagation of the longitudinal waves and with the same periodicity. The resulting distribution of metal forms an optical grating which has up to 100,000 lines per centimeter.

Now referring to the drawing there is shown by illustration in block diagram suitable elements for carrying out the invention. As shown, FIG. 1 illustrates a driver-oscillator 10 of any well known design for producing a monochromatic sound wave having a frequency range of from about 6,000 to about 60,000 megacycles/sec. A quartz or ruby crystal 11 is positioned relative to the driver-oscillator such that the sound wave generated by the driver-oscillator is directed into one end of the crystal. The opposite end of the crystal is provided with a reflector 12 for reflecting the wave back through the crystal. The standing vibrational wave in the crystal produces a standing vibration pattern of atoms in the surface of the crystal characterized as a periodic variation of the local temperature of the surface. Metal atoms 13 as represented by the arrows are evaporated onto the surface by any suitable means such as shown in FIG. 3. The metal atoms accumulate in definite lines perpendicular to the direction of propagation of the longitudinal wave and with the same periodicity, as shown in FIG. 2.

FIG. 3 illustrates a typical set-up of a device for carrying out the method of the present invention. The device includes two, double walled containers 21 and 22, one seated inside the other and separated therefrom by a vacuum space 23. A window 30 is provided to view the inside, if desired. A wave guide 24 extends into the confined area of container 21 and is spaced from the inner wall surface. A ruby or quartz 11 is secured to the wave guide with one end extending into the wave guide and with the major portion extending outwardly therefrom into the area confined by the container 21 and perpendicular thereto. A device such as a tungsten coil heater 25 is positioned relative to the portion of the crystal extending from the wave guide such that an aluminum metal strip 26 or strips are placed therein and evaporated by the heater coil. Current from an outside source not shown for simplification of the drawing is fed to the heater coil to produce the heat necessary to vaporize the aluminum metal. In order to confine as much heat as possible to the area of the heater coil a heat shield 31 is used. The wave guide which directs the sound waves to the crystal 11 is connected to any suitable microwave source not shown for simplification of the drawings. Each of the containers 21 and 22 have a filler pipe 28 for admitting the liquid oxygen and liquid helium to the container and the space between the containers is evacuated through pipe 29.

In order to align the atoms of the crystal, a magnetic field is applied cross the crystal. In the use of a quartz crystal, the end of the quartz crystal that extends into the wave guide section has a paramagnetic metal film 27 applied thereto and the magnetic field is applied perpendicular to the longitudinal axis of the crystal. In the case a ruby crystal is used, the ruby crystal is uncoated and the magnetic field is applied along the longitudinal axis.

In operation of the device the space contained by container 21 and the space 23 between containers 21 and 22 is evacuated, liquid oxygen is placed in container 22, and liquid helium is placed in container 21 to cool the crystal down to a temperature of about 4° Kelvin. The magnetic field is applied depending on the crystal used as described above, and then the excitation from the microwave source is applied to the crystal through the wave guide. After sufficient time, the sound wave produces a standing vibrational pattern of atoms in the surface of the crystal, then the current is applied to the tungsten heater to evaporate the aluminum metal which deposits onto the crystal. The metal atoms of aluminum then align themselves in definite lines on the crystal which are perpendicular to the direction of propagation of the longitudinal waves and with the same periodicity. The crystal is then permitted to return to room temperature and removed from the apparatus as an optical grating having about 100,000 lines per centimeter.

The wavelength of the standing sound wave is given by $\lambda = c/f$, where C is the speed of sound in quartz, approximately 6,000 m./sec. Thus, when a frequency of the order of 6,000 to 60,000 megacycles/sec. is used, the resulting wavelength is of the order of 10,000 to 1,000 Angstroms.

In order to prevent degradation of the acoustic wave, it is necessary that the crystal be of high quality. That is, low in dislocations of the atoms and other imperfections. It is also necessary that the crystal be held at a low temperature of about 4° K. during the process of applying the metal atoms to the "active" surface of the crystal. For this reason the equipment used is assembled such that the crystal temperature of 4° K. is maintained during the evaporation of the metal atoms. In order to use as little heat as possible, the evaporation of the metal is carried out by application of heat for as little time as necessary to evaporate the aluminum.

The apparatus shown by illustration in FIG. 3 to carry out the method of the present invention is exemplary only since there are other such apparatus which will be obvious to one skilled in the art by which the method can be carried out.

Obviously many modifications and variations of the present invention are possible in the light of the above teachings. It is therefore to be understood that within the scope of the appended claims the invention may be practiced otherwise than as specifically described.

What is claimed is:

1. A method of producing a lined optical grating which comprises:
   (a) cooling an elongated rectangular crystal of high quality to a temperature of about 4° K.,
   (b) sending a monochromatic standing longitudinal sound wave having a frequency of from about 6,000 to about 60,000 magacycles/sec. through an end of said crystal to produce a standing vibration pattern of atoms in the surface of said crystal along the longitudinal length of said crystal,
   (c) vaporizing a metal into atoms of the metal, and
   (d) depositing said metal atoms onto the surface of said crystal having said standing vibration pattern of atoms therein, wherein said metal atoms form definite lines on the surface of said crystal.

2. The method as claimed in claim 1, wherein:
the crystal is quartz.

3. A method of producing a lined optical grating which comprises:
   (a) cooling an elongated rectangular crystal of high quality to a temperature of about 4° K.,
   (b) applying a magnetic field across said crystal,
   (c) sending a monochromatic standing longitudinal sound wave having a frequency of from about 6,000 to about 60,000 megacycles/sec. through an end of said crystal to produce a standing vibration pattern of atoms in the surface of said crystal along the longitudinal length of said crystal,
   (d) vaporizing a metal into atoms of the metal, and
   (e) depositing said metal atoms onto the surface of said crystal having said standing vibration pattern of atoms therein, wherein said metal atoms form definite lines on the surface of said crystal.

4. The method as claimed in claim 3, wherein:
the crystal is quartz.

References Cited

UNITED STATES PATENTS

| | | | |
|---|---|---|---|
| 2,074,281 | 3/1937 | Sommer | 117—107.1 X |
| 2,532,971 | 12/1950 | Van Leer et al. | 117—107.1 X |
| 3,045,531 | 7/1962 | Prescott | 88—1 X |
| 3,235,630 | 2/1966 | Doherty et al. | 88—1 X |
| 3,243,784 | 3/1966 | Anderson et al. | 117—37.7 X |

WILLIAM D. MARTIN, *Primary Examiner.*

W. D. HERRICK, *Examiner.*